(12) United States Patent
Worthington

(10) Patent No.: US 10,650,375 B2
(45) Date of Patent: May 12, 2020

(54) METHOD OF AUTHENTICATING AND EXCHANGING VIRTUAL CURRENCY

(71) Applicant: Sean H. Worthington, Chico, CA (US)

(72) Inventor: Sean H. Worthington, Chico, CA (US)

( * ) Notice: Subject to any disclaimer, the term of this patent is extended or adjusted under 35 U.S.C. 154(b) by 549 days.

(21) Appl. No.: 15/486,987

(22) Filed: Apr. 13, 2017

(65) Prior Publication Data

US 2017/0372277 A1    Dec. 28, 2017

Related U.S. Application Data

(60) Provisional application No. 62/354,022, filed on Jun. 23, 2016.

(51) Int. Cl.
*G06Q 40/00* (2012.01)
*G06Q 20/38* (2012.01)
*G06Q 20/40* (2012.01)
*G06Q 20/06* (2012.01)

(52) U.S. Cl.
CPC ......... *G06Q 20/3821* (2013.01); *G06Q 20/06* (2013.01); *G06Q 20/38215* (2013.01); *G06Q 20/405* (2013.01)

(58) Field of Classification Search
CPC .............. G06Q 40/00; G06Q 20/3821; G06Q 20/38215; G06Q 20/405
See application file for complete search history.

(56) References Cited

U.S. PATENT DOCUMENTS

| 8,234,185 B2 | 7/2012 | Davis |
| 9,094,212 B2 | 7/2015 | Thomas et al. |
| 2002/0178363 A1 | 11/2002 | Ambrogio |
| 2003/0136837 A1 | 7/2003 | Amon |
| 2013/0225123 A1* | 8/2013 | Adjakple ............... H04W 4/24 455/406 |
| 2014/0279458 A1* | 9/2014 | Holman ............... G06Q 20/227 705/40 |

(Continued)

FOREIGN PATENT DOCUMENTS

WO    WO2015118519 A1    8/2015

OTHER PUBLICATIONS

Trusting records: is Blockchain technology the answer? Lemieux, Victoria Louise. Records Management Journal26.2: 110-139. Emerald Group Publishing Limited. (2016) (Year: 2016).*

*Primary Examiner* — Lalita M Hamilton

(57) ABSTRACT

A method of authenticating and exchanging virtual currency is used to permit secure ownership of virtual currency and manage financial transactions. The method is performed by a system that includes a user computing device and plurality of remote servers. The user computing device stores an unverified certificate which is used as currency. The plurality of remote servers is used to authenticate the unverified certificate and aid in transferring ownership of the unverified certificate. To do so, each remote server executes an authentication process for the unverified certificate and sends either a pass status or a fail status to the user computing device. The user computing device executes an assessment process for the unverified certificate based on the pass statuses and fail statuses received. Authentication information related to the unverified certificate is then updated on the user computing device and each remote server that returned the pass status.

17 Claims, 22 Drawing Sheets

(56) References Cited

U.S. PATENT DOCUMENTS

2015/0324789 A1* 11/2015 Dvorak .............. G06Q 20/3823
                                                       705/67
2016/0132704 A1    5/2016 Engels et al.
2017/0178121 A1*  6/2017 Roberts ................ G06Q 20/341
2017/0330180 A1* 11/2017 Song ....................... G06F 21/33

* cited by examiner

US 10,650,375 B2

METHOD OF AUTHENTICATING AND EXCHANGING VIRTUAL CURRENCY

The current application claims a priority to the U.S. Provisional Patent application Ser. No. 62/354,022 filed on Jun. 23, 2016.

FIELD OF THE INVENTION

The present invention relates generally to methods of managing virtual currency and related transactions. More specifically, the present invention is a method of authenticating and exchanging virtual currencies that prevents counterfeiting and theft.

BACKGROUND OF THE INVENTION

Physical and virtual currencies can both be counterfeited or stolen to various extents. Though physical money contains unique patterns and characteristics, counterfeiters have been able to create realistic bills which can be mistaken for real money by an untrained eye. Physical money is also susceptible to theft when carried or stored in an insecure location. As a result, many people opt to store money in banks for safekeeping. Though banks are relatively effective at safeguarding a person's money, many banks charge fees on users and can be inconvenient if money is needed at a moment's notice. Virtual currencies are beneficial in that they may be spent immediately when needed. However, virtual currencies may be counterfeited similar to physical currencies or double spent. Both can lead to a loss in the value of the virtual currency.

Accordingly, there is a present need for a currency that cannot be counterfeited and is readily available for users to spend. The present invention is a method of authenticating and exchanging virtual currency which prevents counterfeiting. The present invention leverages a plurality of remote servers which operate independently. This configuration ensures that if a single remote server malfunctions or is tampered with, the remaining servers will be unaffected and can even be used to fix the affected server. During a transaction, the remote servers are used to verify that virtual currency is genuine. Each unit of currency is associated with a certificate which updates as a transaction is made. The currency is managed online but may be stored virtually or physically printed and used as paper money. This creates an added versatility which maximizes convenience for users.

DETAILED DESCRIPTION OF THE INVENTION

All illustrations of the drawings are for the purpose of describing selected versions of the present invention and are not intended to limit the scope of the present invention.

With reference to FIGS. 1-4, the present invention is a method of authenticating and exchanging virtual currency. The present invention is used to permit anonymous and secure ownership of virtual currency and prevent unauthorized or double spending. The method of the present invention is performed by a system which comprises a user computing device and a plurality of remote servers (Step A). The user computing device stores an unverified certificate. The unverified certificate is used as a form of currency. In order to determine the authenticity of the unverified certificate, the unverified certificate is sent from the user computing device to each remote server (Step B). Each remote server executes an authentication process for the unverified certificate in order to designate each remote server with either a pass status or a fail status (Step C). The remote servers are designed to function independently. This minimizes the possibility of forging or counterfeiting certificates. Further, because the remote servers operate independently, the system is inherently fault tolerant. Each remote server sends the pass status or the fail status to the user computing device (Step D). The user computing device executes an assessment process for the unverified certificate which is cumulatively based on the pass status or the fail status (Step E). The user computing device and a plurality of confirmed servers update authentication information related to the unverified certificate (Step F). Each confirmed server is designated with the pass status and is from the plurality of remote servers. The process of updating the user computing device and each of the confirmed servers alters the unverified certificate in order to pass ownership of the unverified certificate to the user computing device. Any of the remote servers that are designated with the fail status may later be repaired so as to fully sync the unverified certificate with each of the remote servers.

Figure 5:
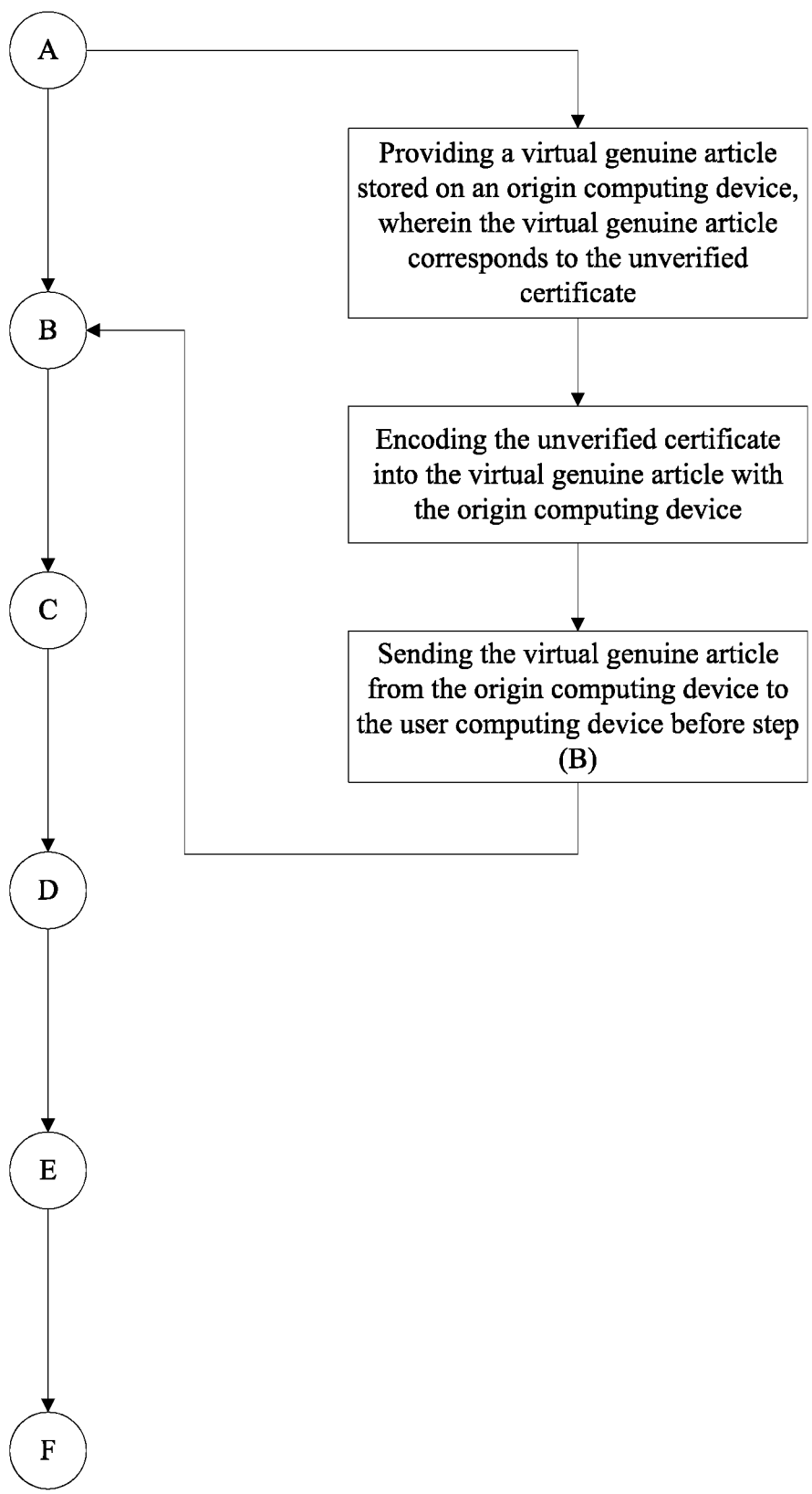
FIG. 5 is a flowchart describing the steps of providing a virtual genuine article.

In reference to FIG. 5, in the preferred embodiment of the present invention, a virtual genuine article which corresponds to the unverified certificate, is stored on an origin computing device. The virtual genuine article acts as a currency which may be traded between users. The unverified certificate is encoded into the virtual genuine article with the origin computing device. This allows the authentication information of the unverified certificate to be hidden within a picture, inside a text document, or within various other types of files. During a transaction, the virtual genuine article is sent from the origin computing device to the user computing device before Step B.

Figure 6:
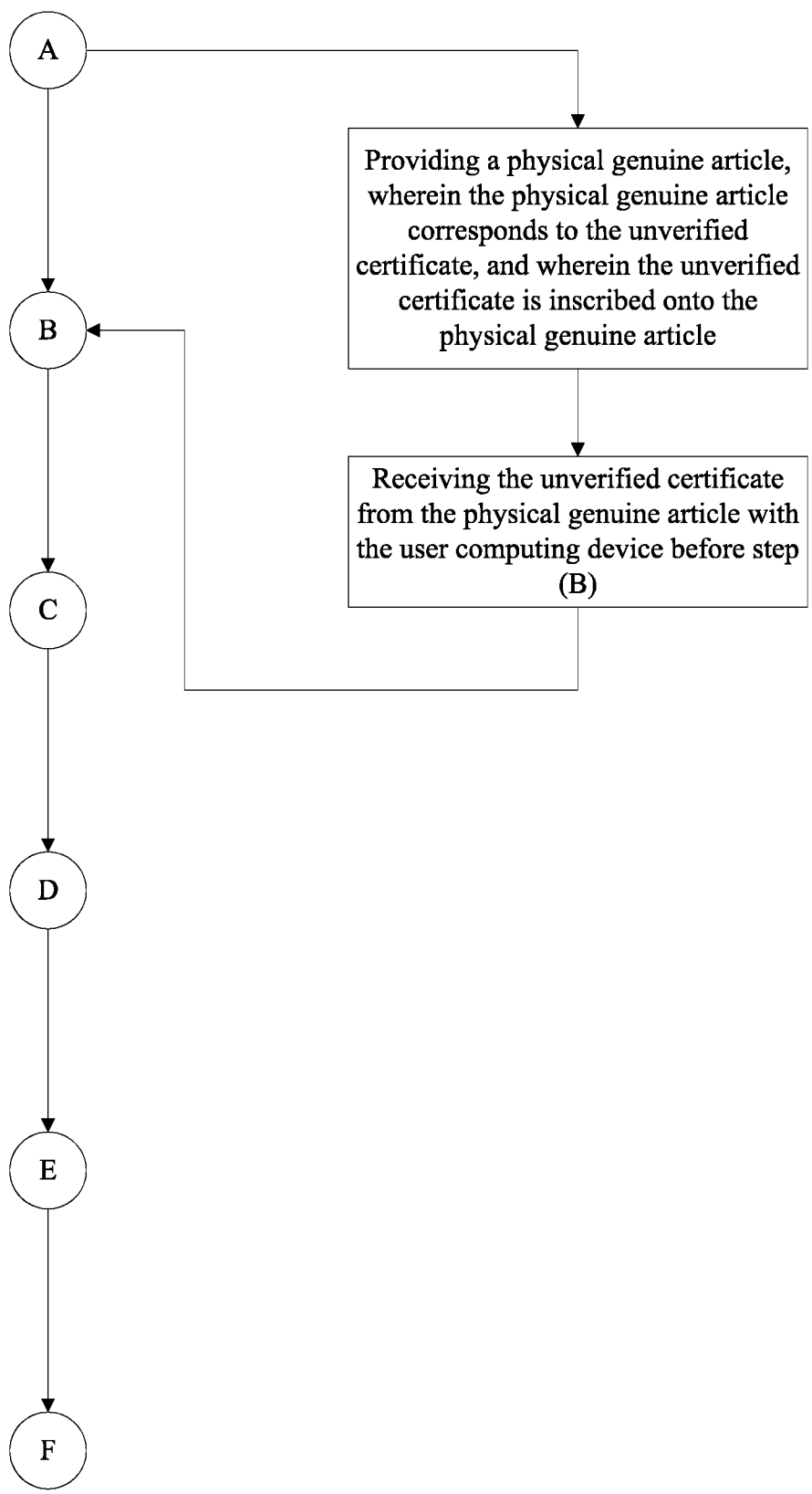
FIG. 6 is a flowchart describing the steps of providing a physical genuine article.

In reference to FIG. 6, in an alternative embodiment of the present invention, the system comprises a physical genuine article which corresponds to the unverified certificate. The unverified certificate is inscribed onto the physical genuine article. This allows the physical genuine article to be used as a physical currency. The unverified certificate may be inscribed in the form of a barcode or a Quick Response (QR) code. Alternatively, the unverified certificate may be inscribed in various other fashions. During a transaction, the unverified certificate is received from the physical genuine article with the user computing device before Step B. This may be done by scanning or photographing the unverified certificate.

Figure 7:
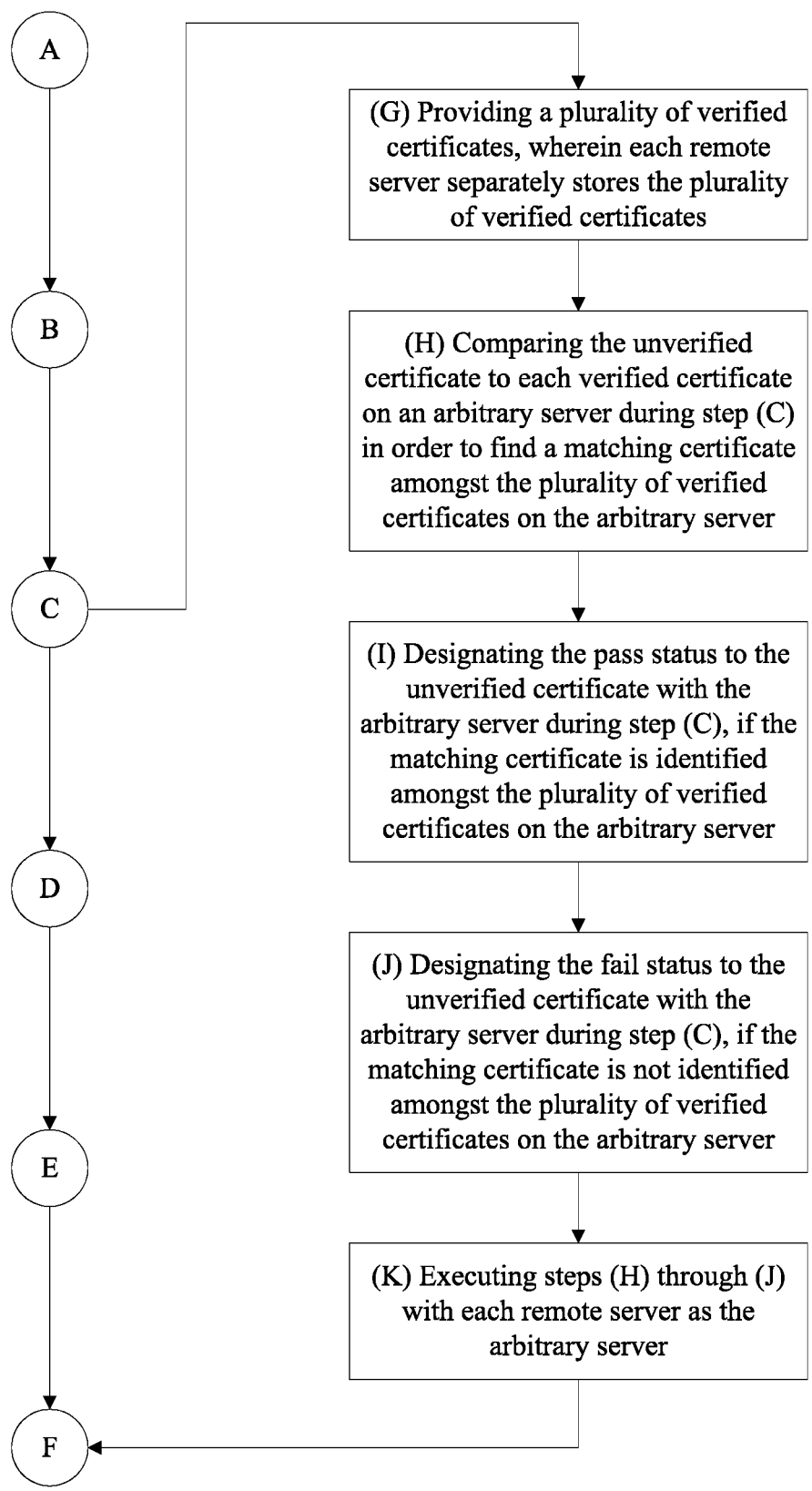
FIG. 7 is a flowchart describing the steps of executing the authentication process for the unverified certificate.

In reference to FIG. 7, the system comprises a plurality of verified certificates, wherein each remote server separately stores the plurality of verified certificates (Step G). The plurality of verified certificates is used to authenticate the unverified certificate. The unverified certificate is compared to each verified certificate on an arbitrary server during Step C in order to find a matching certificate amongst the plurality of verified certificates on the arbitrary server (Step H). If the matching certificate is identified amongst the plurality of verified certificates on the arbitrary server, the arbitrary server designates the pass status to the unverified certificate during Step C (Step I). Alternatively, if the matching certificate is not identified amongst the plurality of verified certificates on the arbitrary server, the arbitrary server designates the fail status to the unverified certificate during Step C (Step J). Steps H through J are executed with each remote server as the arbitrary server (Step K). Each pass status and fail status is then used during Step E to determine if the unverified certificate is authentic and may be updated.

Figure 8:
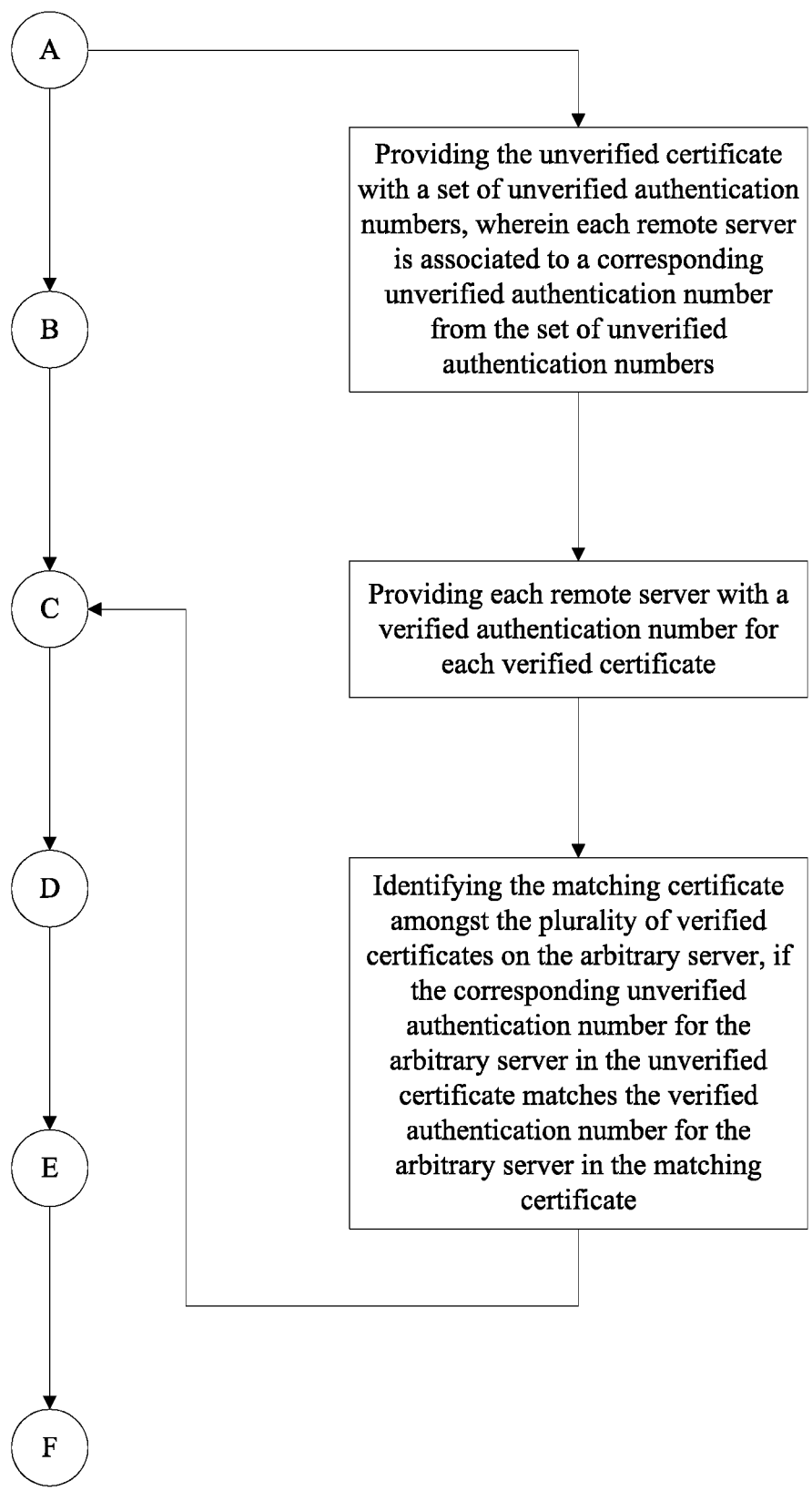
FIG. 8 is a flowchart describing the steps of identifying the matching certificate for the unverified certificate.

In reference to FIG. 8, when comparing the unverified certificate to the plurality of verified certificates, each remote server uses the authentication information which is later updated in Step F. The unverified certificate comprises a set of unverified authentication numbers. Each remote server is associated to a corresponding unverified authentication number from the set of unverified authentication numbers. As a result, each of the remote servers uses the corresponding unverified authentication number like a password which helps to authenticate the unverified certificate. Each remote server is provided with a verified authentication number for each verified certificate. If the corresponding unverified authentication number for the arbitrary server in the unverified certificate matches the verified authentication number for the arbitrary server in the matching certificate, the matching certificate is identified amongst the plurality of verified certificates on the arbitrary server. The arbitrary server then returns the pass status. To aid with the process of matching the unverified certificate to a verified certificate, each remote server stores a verified serial number for each verified certificate. Similarly, the unverified certificate comprises an unverified serial number. The unverified serial number and each of the verified serial numbers are simply used for identifying certificates and are never changed. As a result, the unverified serial number may be used to link the unverified certificate with a verified certificate even if a matching certificate is not found. This functionality is needed when repairing a remote server that is designated with the fail status.

Figure 9:
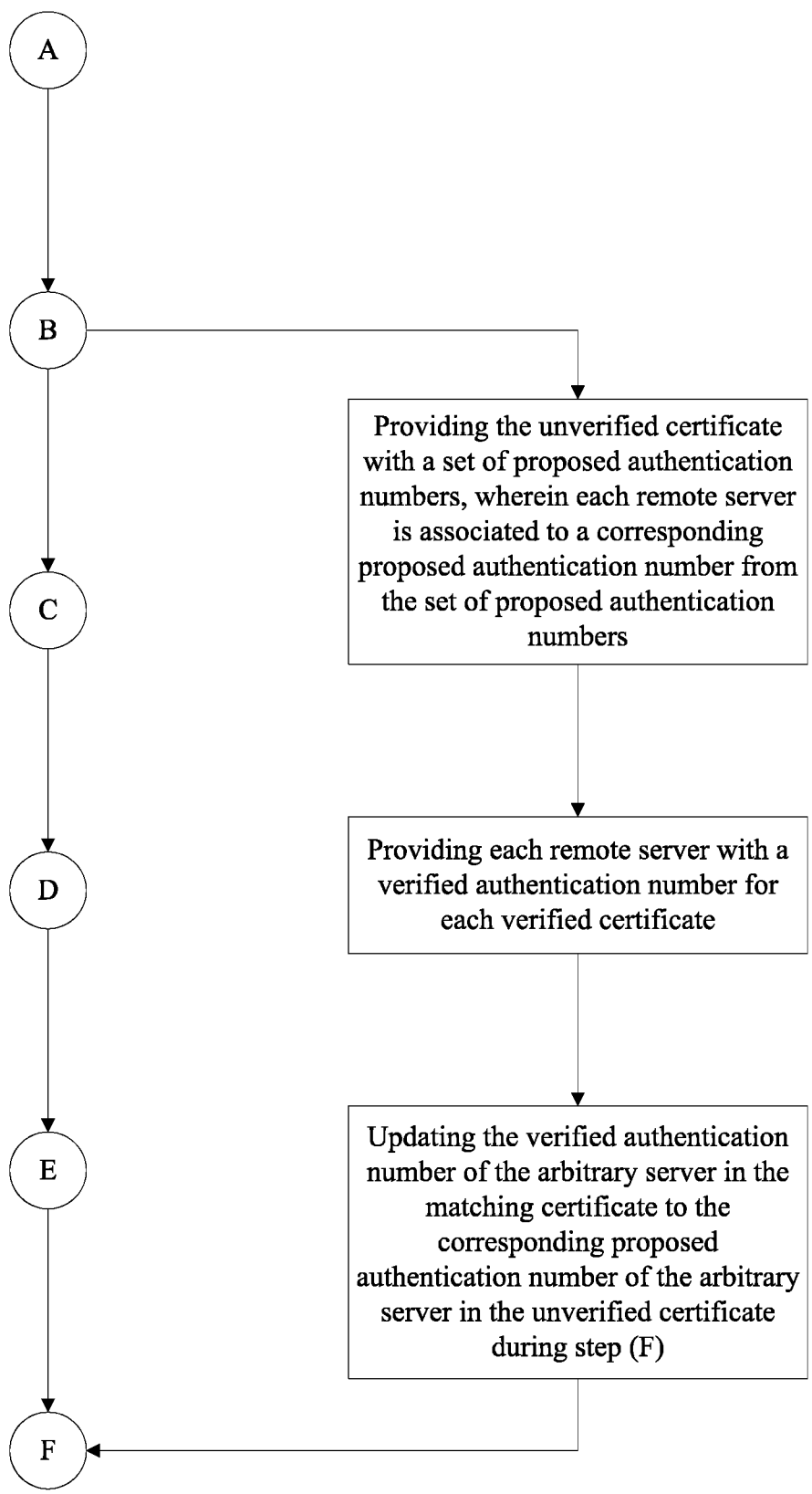
FIG. 9 is a flowchart describing the steps of updating the confirmed server.

In reference to FIG. 9, the unverified certificate is provided with a set of proposed authentication numbers. When updating the unverified certificate, the set unverified authentication numbers and each verified authentication number for the matching certificate are changed according to the set of proposed authentication numbers. This is done to effectively change ownership from whichever entity previously owned the unverified certificate and to the user computing device. Similar to the unverified authentication numbers, each remote server is associated to a corresponding proposed authentication number from the set of proposed authentication numbers. This allows each remote server to update with a unique proposed authentication number. During Step F, the verified authentication number of the arbitrary server in the matching certificate is updated to the corresponding proposed authentication number of the arbitrary server in the unverified certificate. The verified authentication number of any remote server(s) designated with the fail status may be updated at a later time.

Figure 10:
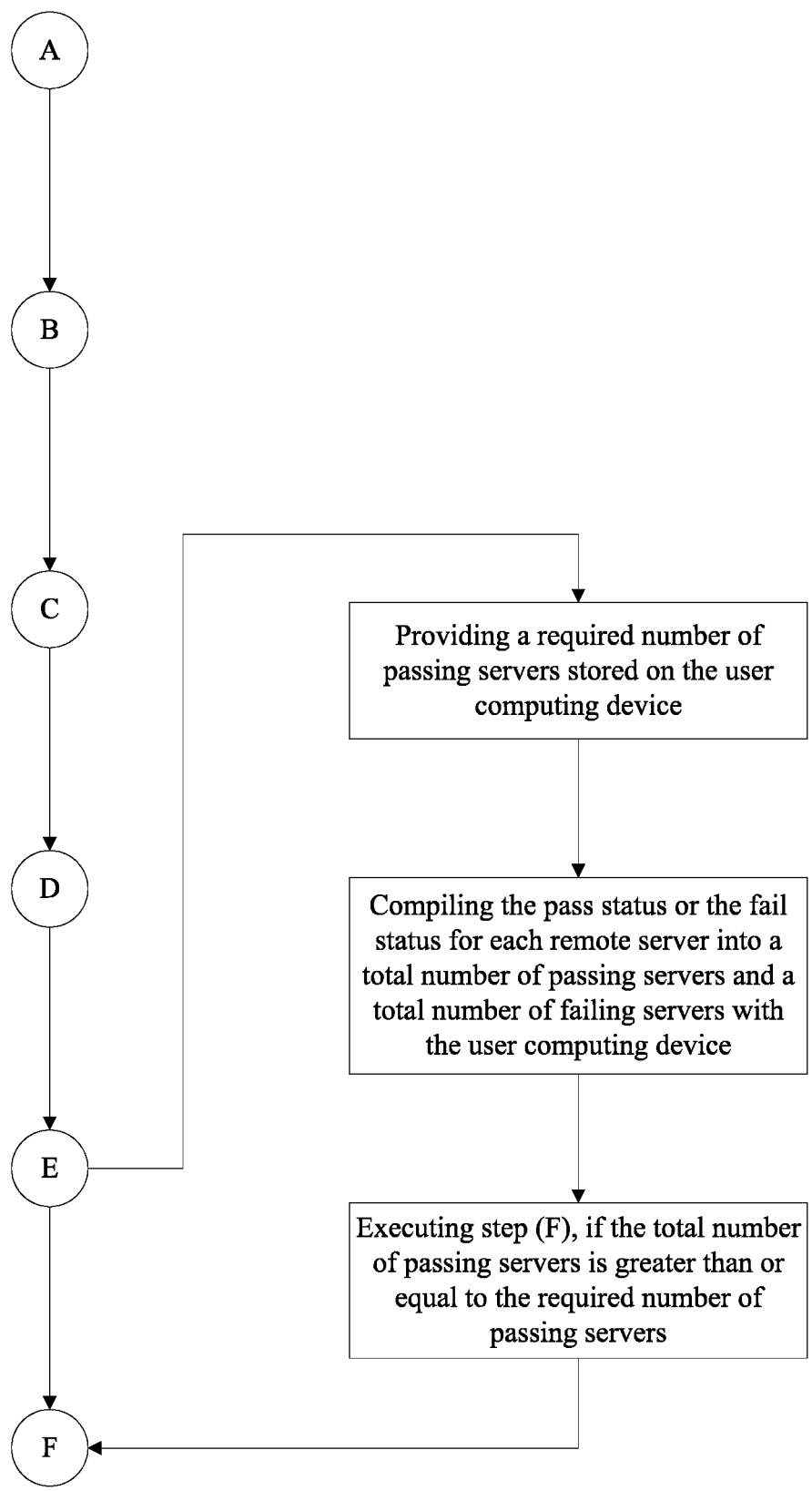
FIG. 10 is a flowchart describing the steps of executing the assessment process for the unverified certificate.

In reference to FIG. 10, the user computing device stores a required number of passing servers. The required number of passing servers is used as a threshold for judging whether or not the unverified certificate is authentic and should be updated. The user computing device compiles the pass status or the fail status for each remote server into a total number of passing servers and a total number of failing servers. Step F is only executed if the total number of passing servers is greater than or equal to the required number of passing servers. Depending on the values of the total number of passing servers and the total number of failing servers, the unverified certificate may be flagged for monitoring or the user computing device may be sent an alert.

Figure 2:
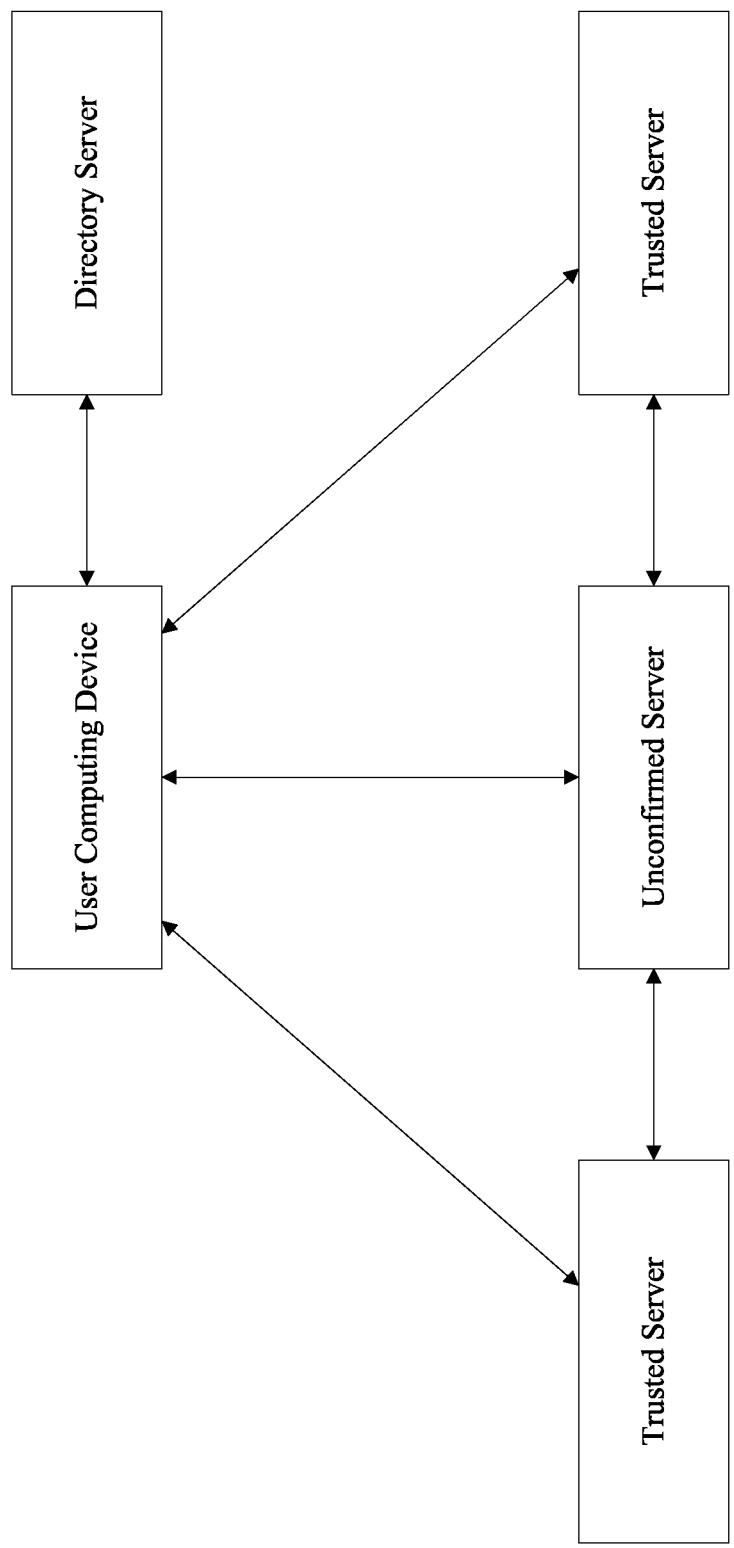
FIG. 2 is a schematic view of the system used by the present invention, showing how the unconfirmed server interacts with the trusted server(s).
Figure 11:
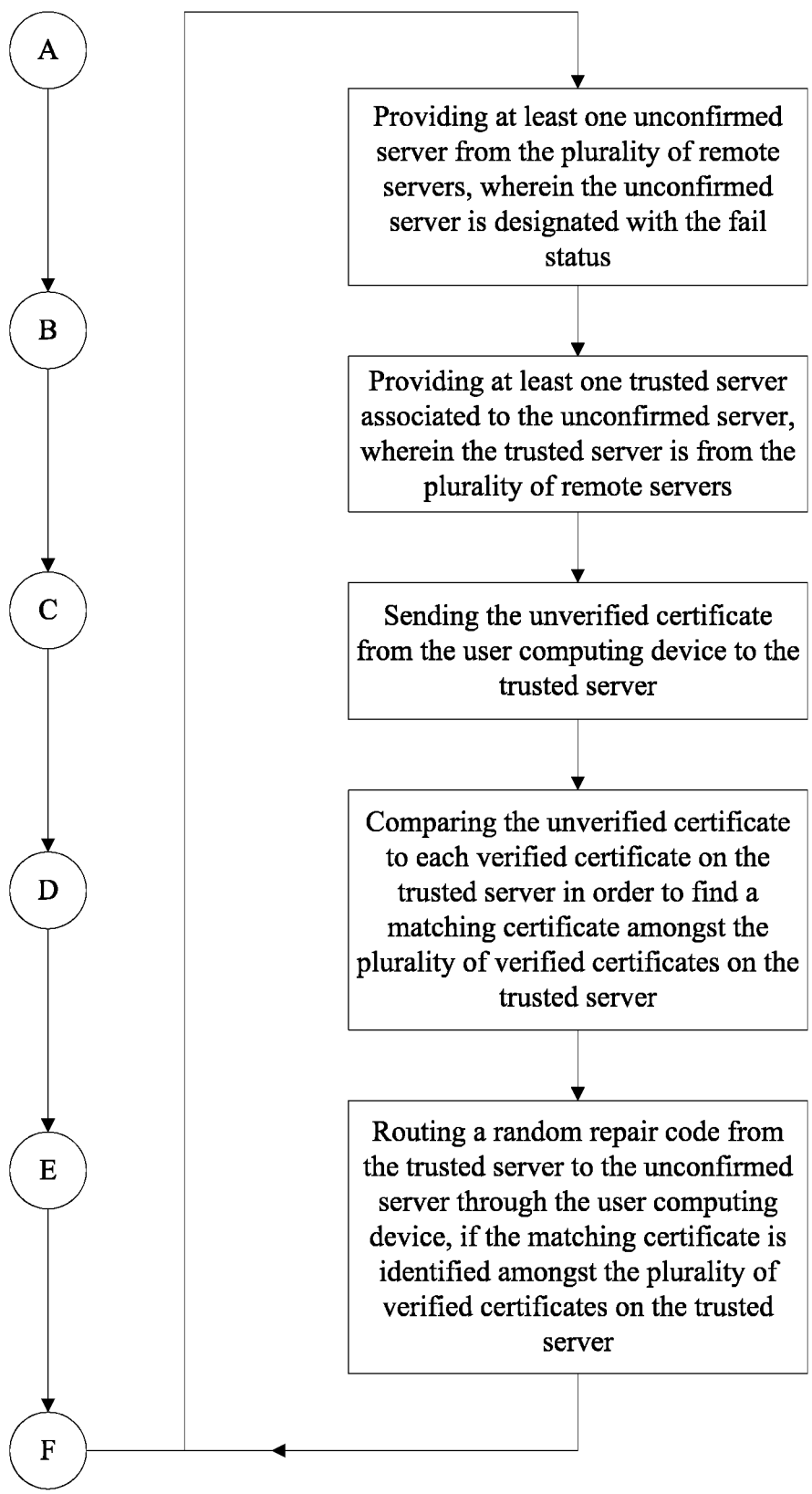
FIG. 11 is a flowchart describing the steps routing the random repair code to the unconfirmed server.

In reference to FIG. 2 and FIG. 11, if one of the remote servers is designated with a fail status, that server is considered an unconfirmed server. At least one trusted server from the plurality of remote servers is associated to the unconfirmed server. The trusted server is used to help determine if the unconfirmed server has malfunctioned or has been tampered with. Further, the trusted server is used to update or repair the unconfirmed server in such a situation. In order to correct the error in the unverified certificate that lead to producing the fail status for the unconfirmed server, the unverified certificate is sent from the user computing device to the trusted server. The unverified certificate is compared to each verified certificate on the trusted server in order to find a matching certificate amongst the plurality of verified certificates on the trusted server. If the matching certificate is identified, a random repair code is routed from the trusted server to the unconfirmed server through the user computing device. The repair code is used to correct the unverified certificate and also acts as a safeguard against unauthorized updates.

Figure 12:
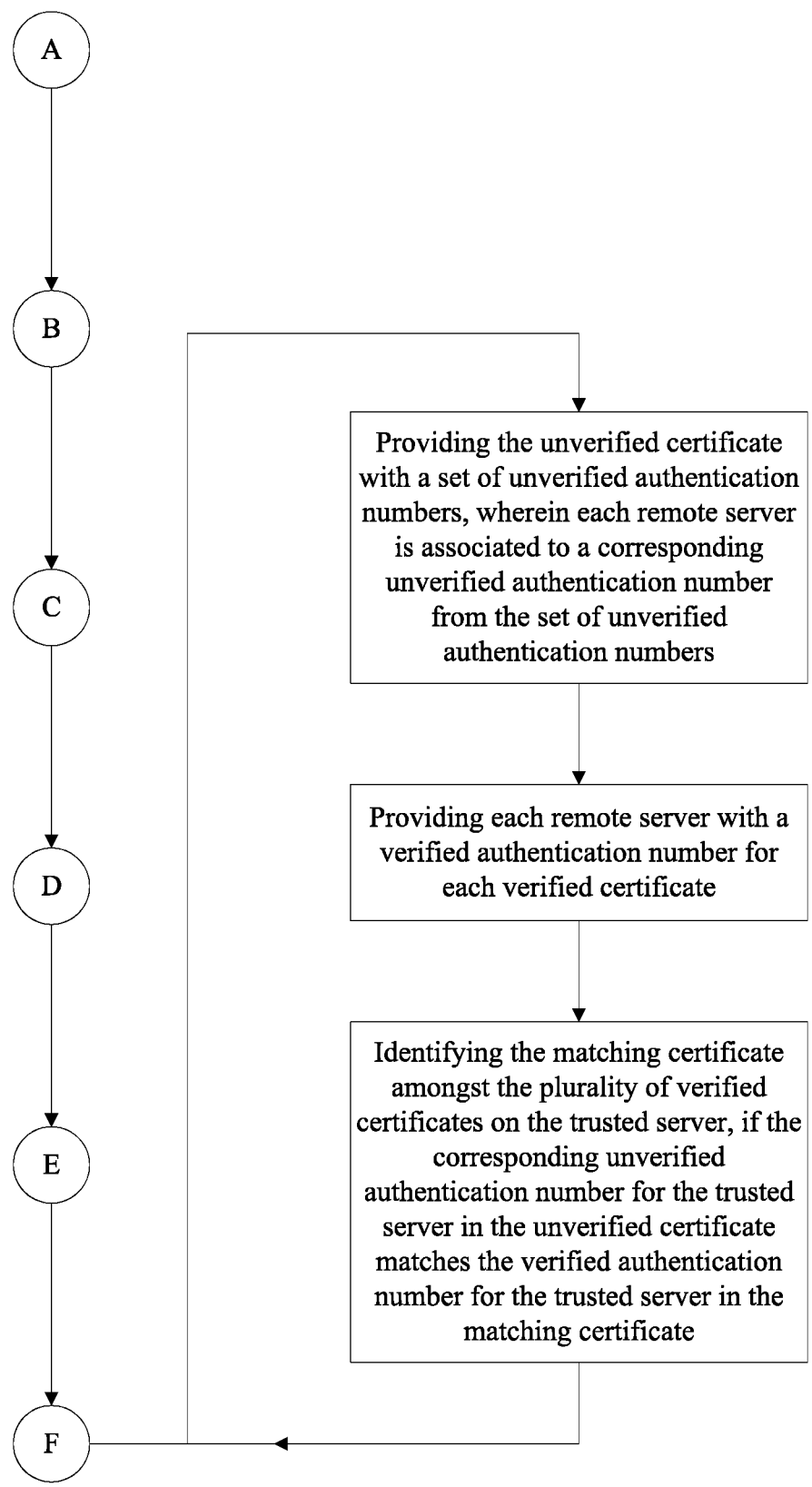
FIG. 12 is a flowchart describing the steps of identifying the matching certificate on the trusted server.

In reference to FIG. 12, in order to find the matching certificate on the trusted server, the trusted server compares the corresponding unverified authentication number with the verified authentication number stored on the server. If the corresponding unverified authentication number for the trusted server in the unverified certificate matches the verified authentication number for the trusted server in the matching certificate, the matching certificate is identified amongst the plurality of verified certificates on the trusted server. The unverified serial number and each of the verified serial numbers are also compared in this manner to identify the matching certificate.

Figure 13:
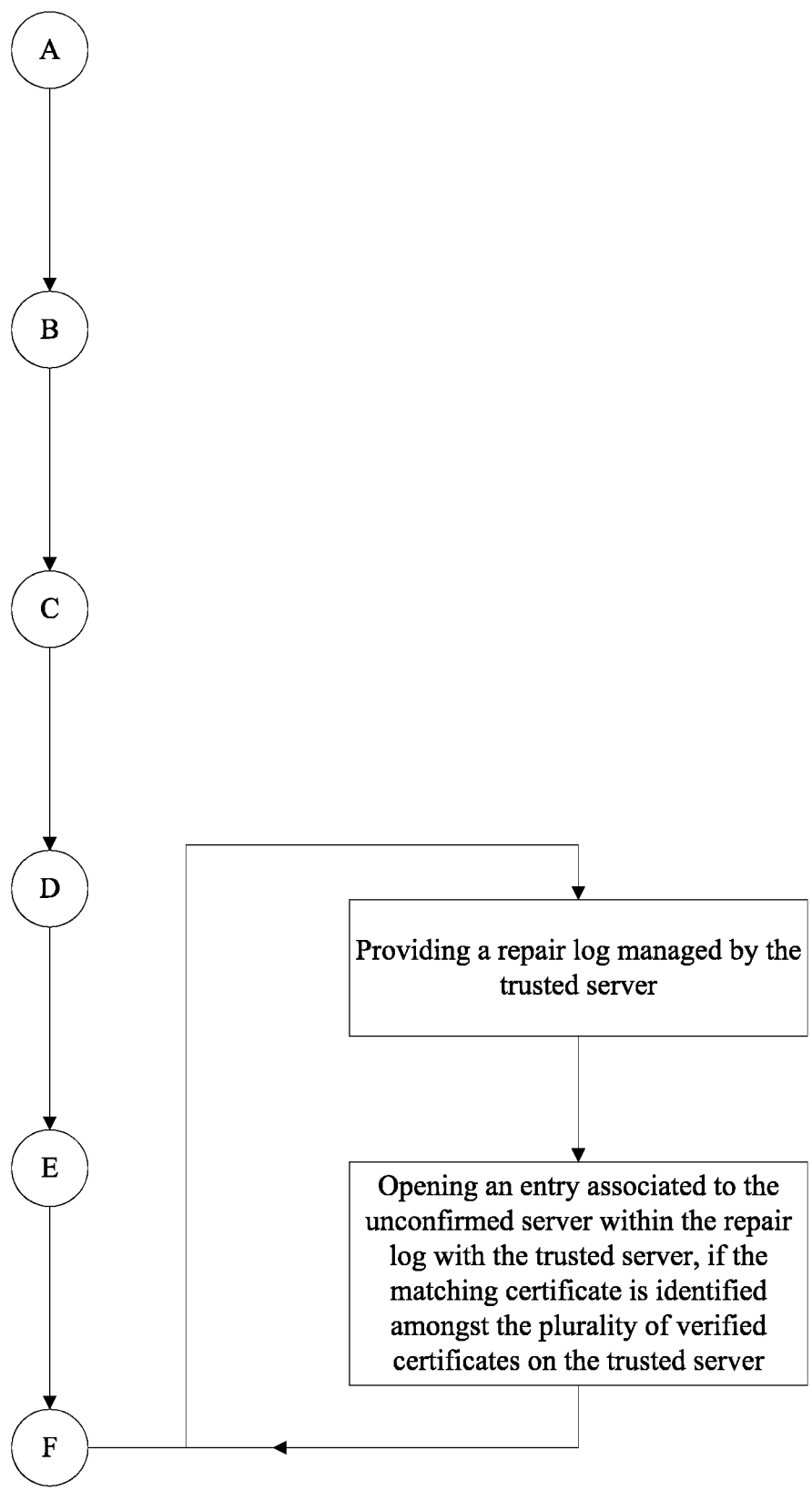
FIG. 13 is a flowchart describing the steps of opening the repair log entry for the unconfirmed server with the trusted server.

In reference to FIG. 13, the trusted server manages a repair log which is used to track the process of repairing the unconfirmed server. If the matching certificate is identified amongst the plurality of verified certificates on the trusted server, the trusted server opens an entry associated to the unconfirmed server within the repair log. The entry associated to the unconfirmed server logs the random repair code used to update the unconfirmed server.

Figure 14A:
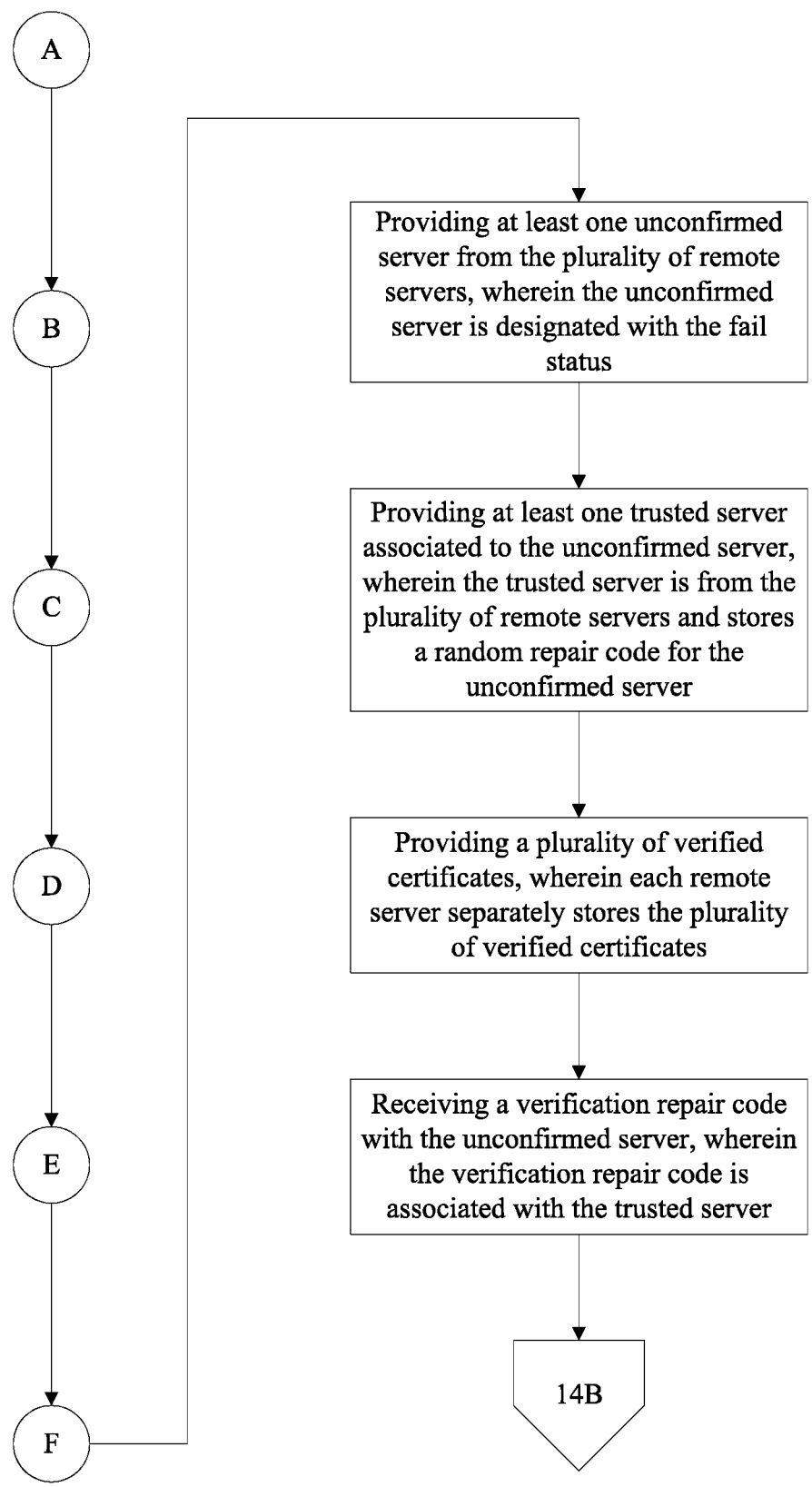
FIG. 14A is a flowchart describing the steps of receiving the verification repair code.
Figure 14B:
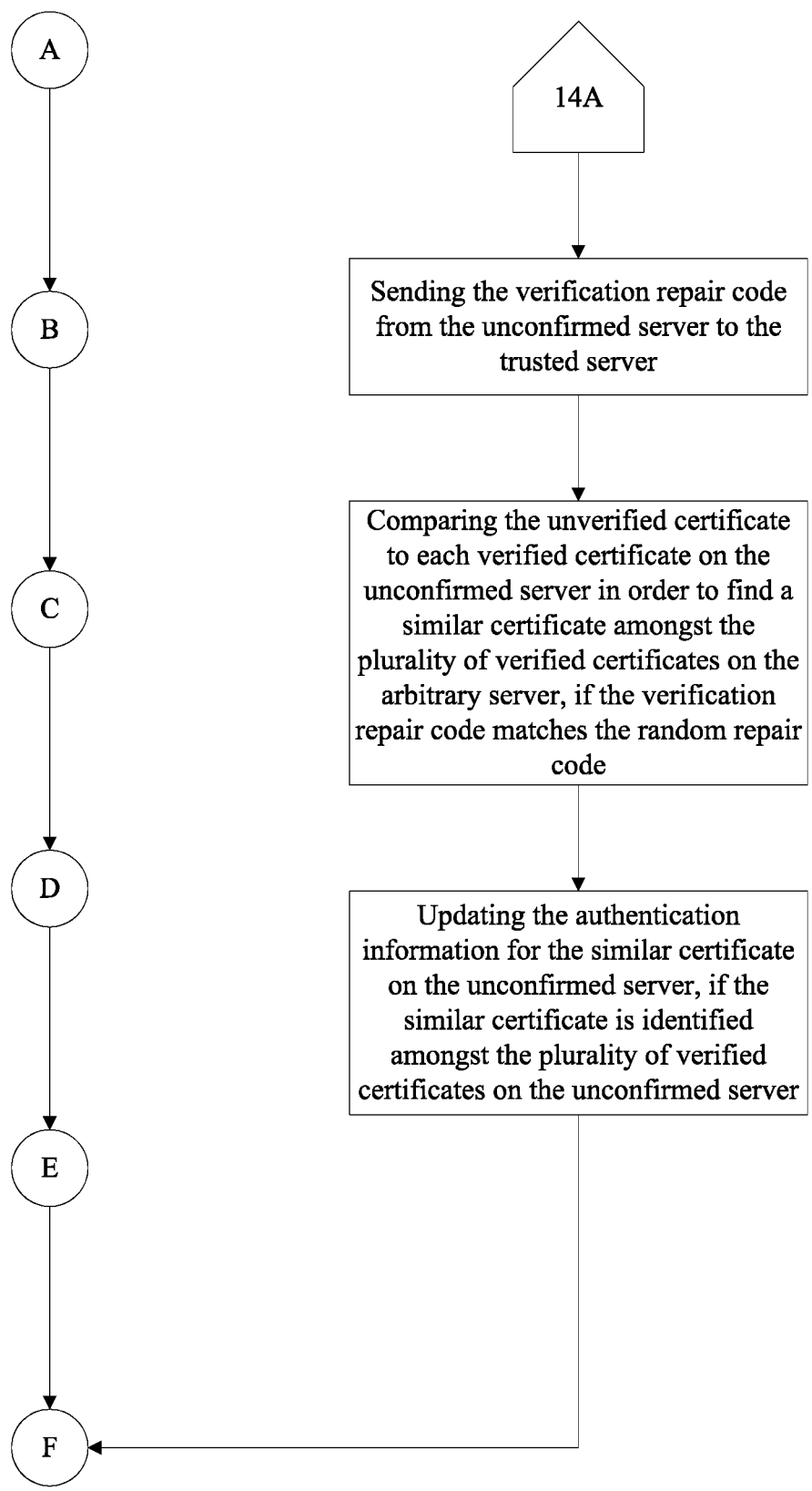
FIG. 14B is a flowchart describing the steps of updating the authentication information for the similar certificate.

In reference to FIGS. 14A-14B, when the unconfirmed server receives a verification repair code, the unconfirmed server sends the verification repair code to the trusted server. The verification repair code originates from the user computing device and is used as a one-time code to verify that the unconfirmed server must be updated. If the verification repair code matches the random repair code, the unconfirmed server compares the unverified certificate to each verified certificate in order to find a similar certificate amongst the plurality of verified certificates on the unconfirmed server. By default, the similar certificate does not exactly match the verified certificate; however, both certificates are linked through the authentication information for each certificate. If the similar certificate is identified amongst the plurality of verified certificates on the unconfirmed server, the authentication information for the similar certificate is updated on the unconfirmed server.

Figure 17:
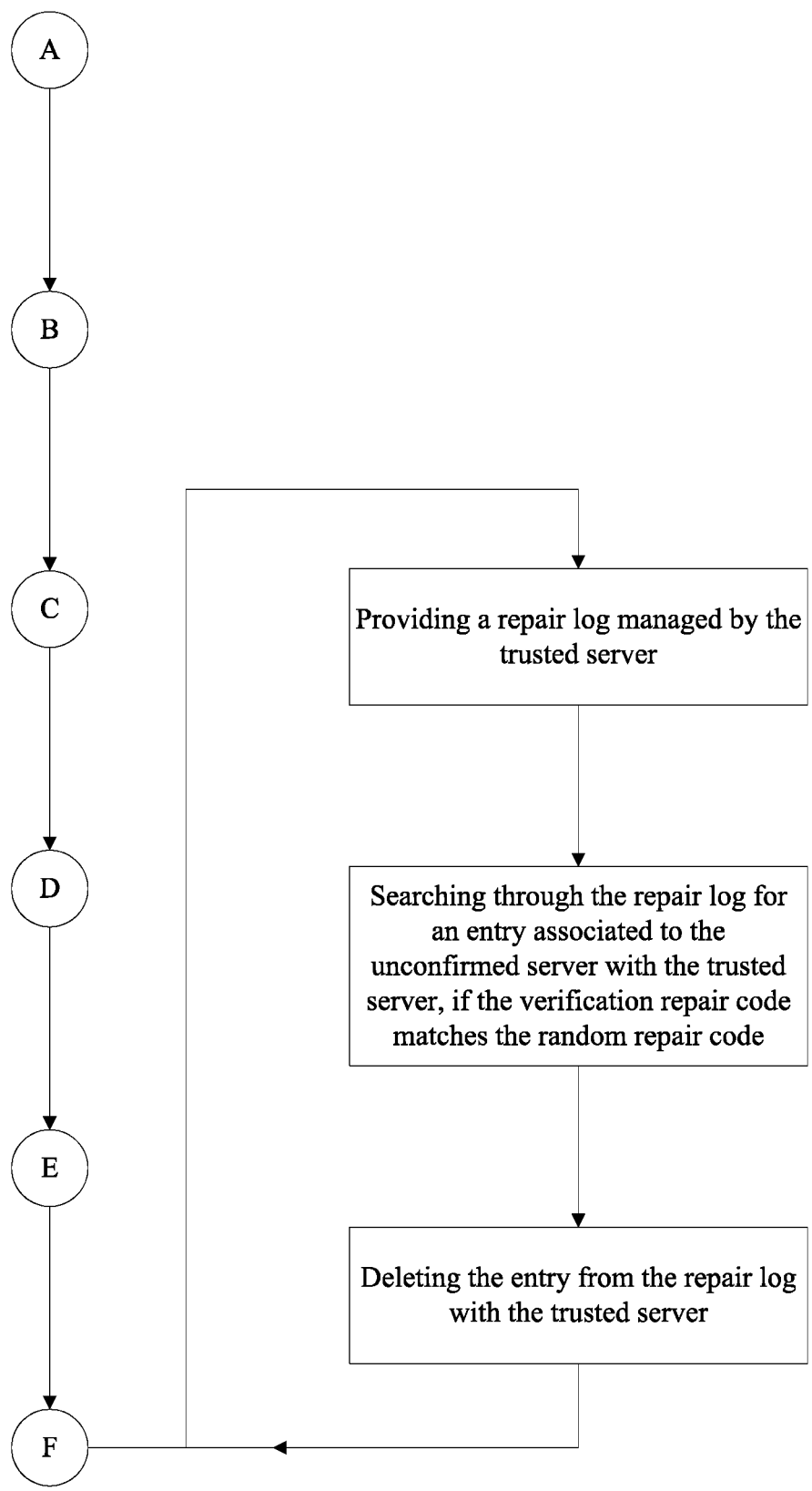
FIG. 17 is a flowchart describing the steps of deleting the entry from the repair log.

In reference to FIG. 17, if the verification repair code matches the random repair code, the trusted server searches through the repair log for the entry associated to the unconfirmed server and deletes the entry from the repair log. This is done to ensure that the random repair code is only used once. In addition to matching the verification repair code to the random repair code, the repair log may be time sensitive. Once the entry is opened, the unconfirmed server may delete the entry if the random repair code and the verification repair code are not matched within a certain amount of time. This helps to protect against tampering.

Figure 15:
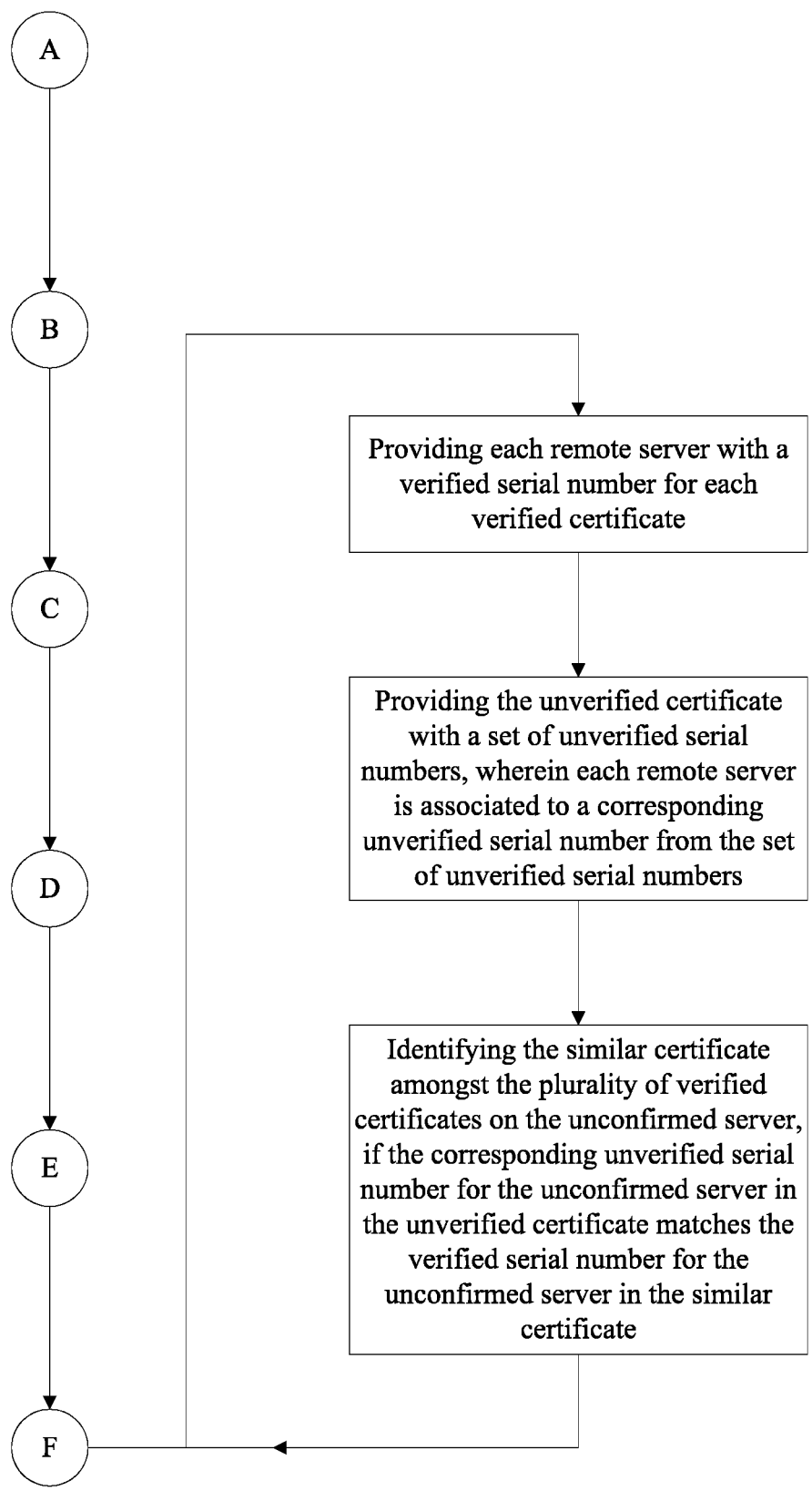
FIG. 15 is a flowchart describing the steps of identifying the similar certificate.

In reference to FIG. 15, because none of the verified certificates will be perfect matches with the unverified certificate due to differing authentication numbers, serial numbers are used to match the unverified certificate with a verified certificate. As previously mentioned, the serial number of each certificate is kept static. As a result, if a matching certificate is not found, the unverified certificate may still be linked to the similar certificate by serial number. If the unverified serial number of the unverified certificate matches the verified serial number of the similar certificate, the similar certificate is identified amongst the plurality of verified certificates on the unconfirmed server.

Figure 16:
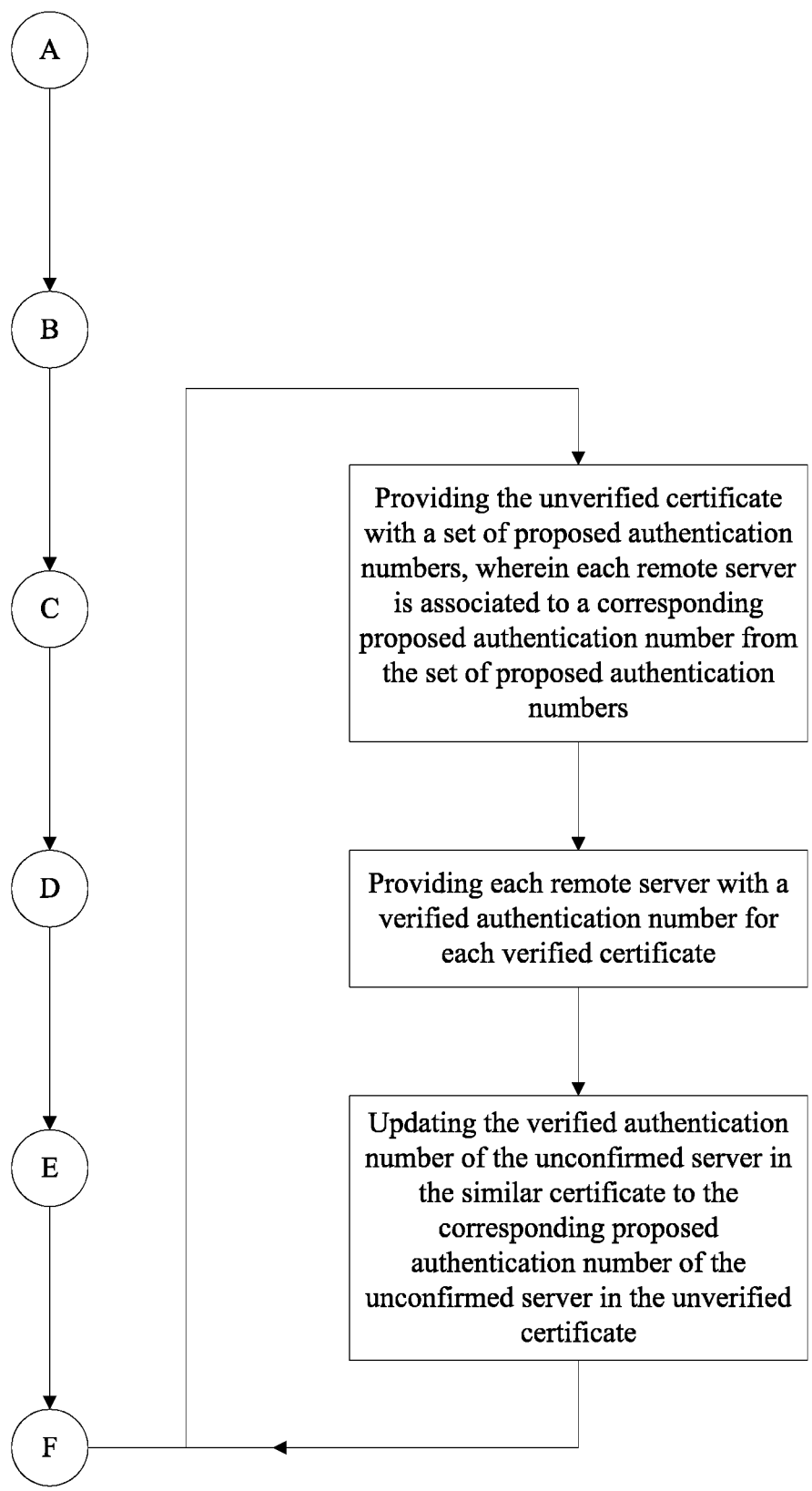
FIG. 16 is a flowchart describing the steps of updating the similar certificate on the unconfirmed server.

In reference to FIG. 16, upon identifying the similar certificate, the verified authentication number of the unconfirmed server in the similar certificate is updated to the corresponding proposed authentication number of the unconfirmed server in the unverified certificate. Because the process of repairing the unconfirmed server happens after each of the confirmed servers and the user computing device have updated, a new set of proposed authentication numbers may be used to update the unconfirmed server, the user computing device, and each of the confirmed servers.

Figure 1:
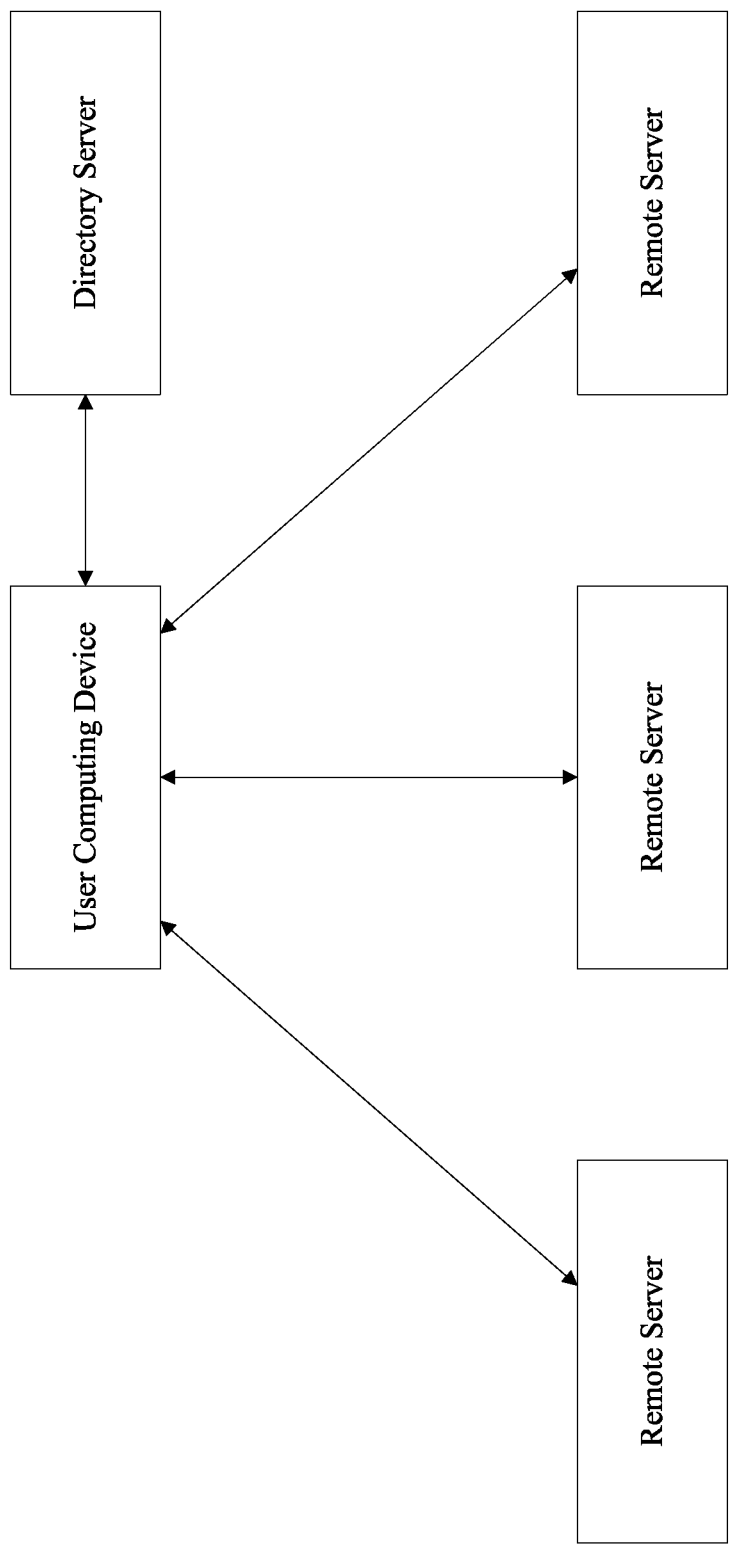
FIG. 1 is a schematic view of the system used by the present invention, showing how the user computing device interacts with the system.
Figure 18:
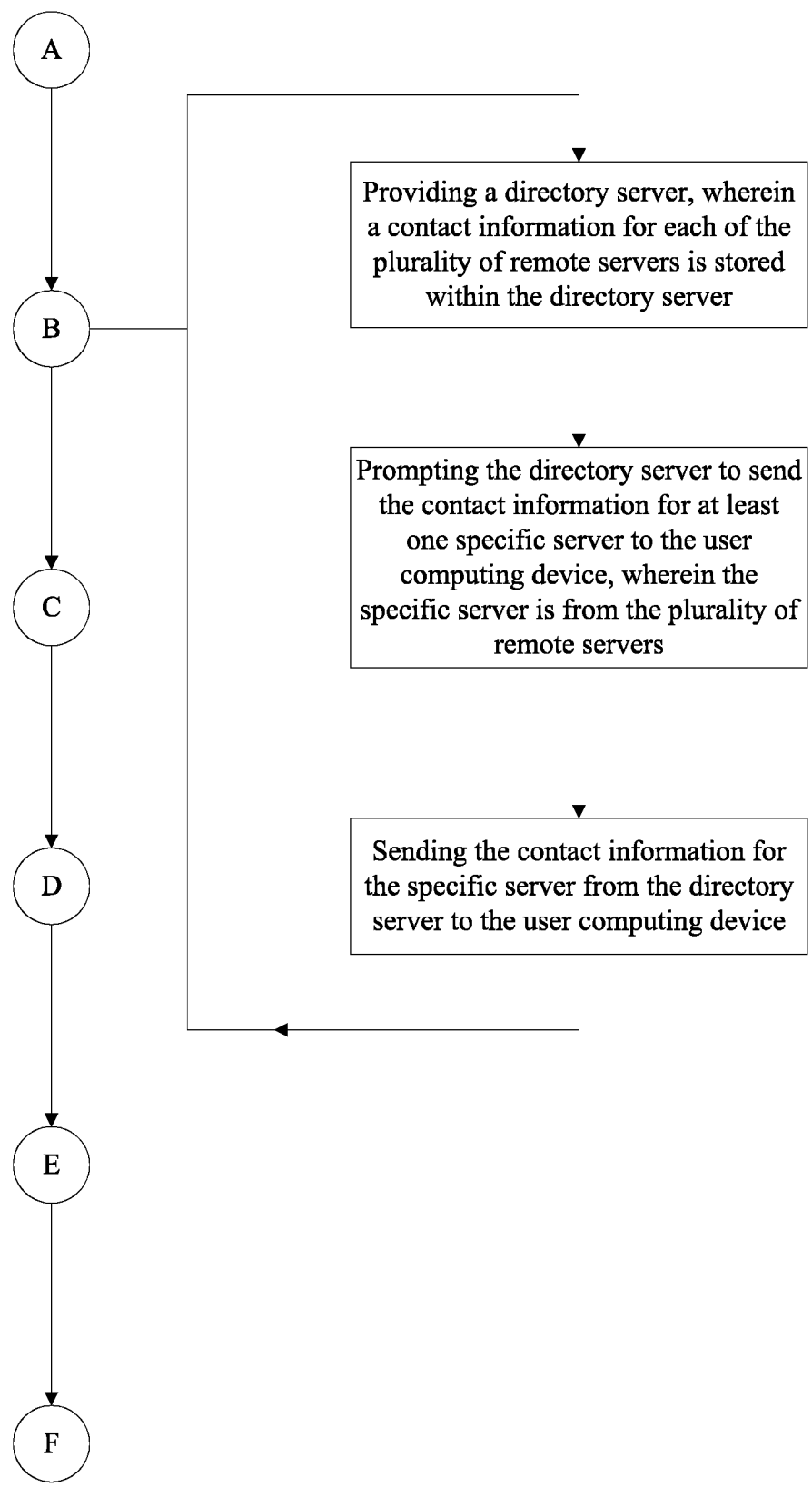
FIG. 18 is a flowchart describing the steps sending the contact information for the specific server using the directory server.

In reference to FIGS. 1-2 and FIG. 18, the system comprises a directory server. The directory server is used to establish communication between the user computing device and the remote servers. Contact information for each of the plurality of remote servers is stored within the directory server and may be accessed by the user computing device during a transaction to contact one or more of the remote servers. To do so, the directory server is prompted to send the contact information for at least one specific server from the plurality of remote servers to the user computing device. The directory server then sends the contact information for the specific server to the user computing device. This may be done during Step B or when sending the unverified certificate to the trusted server.

Figure 3:
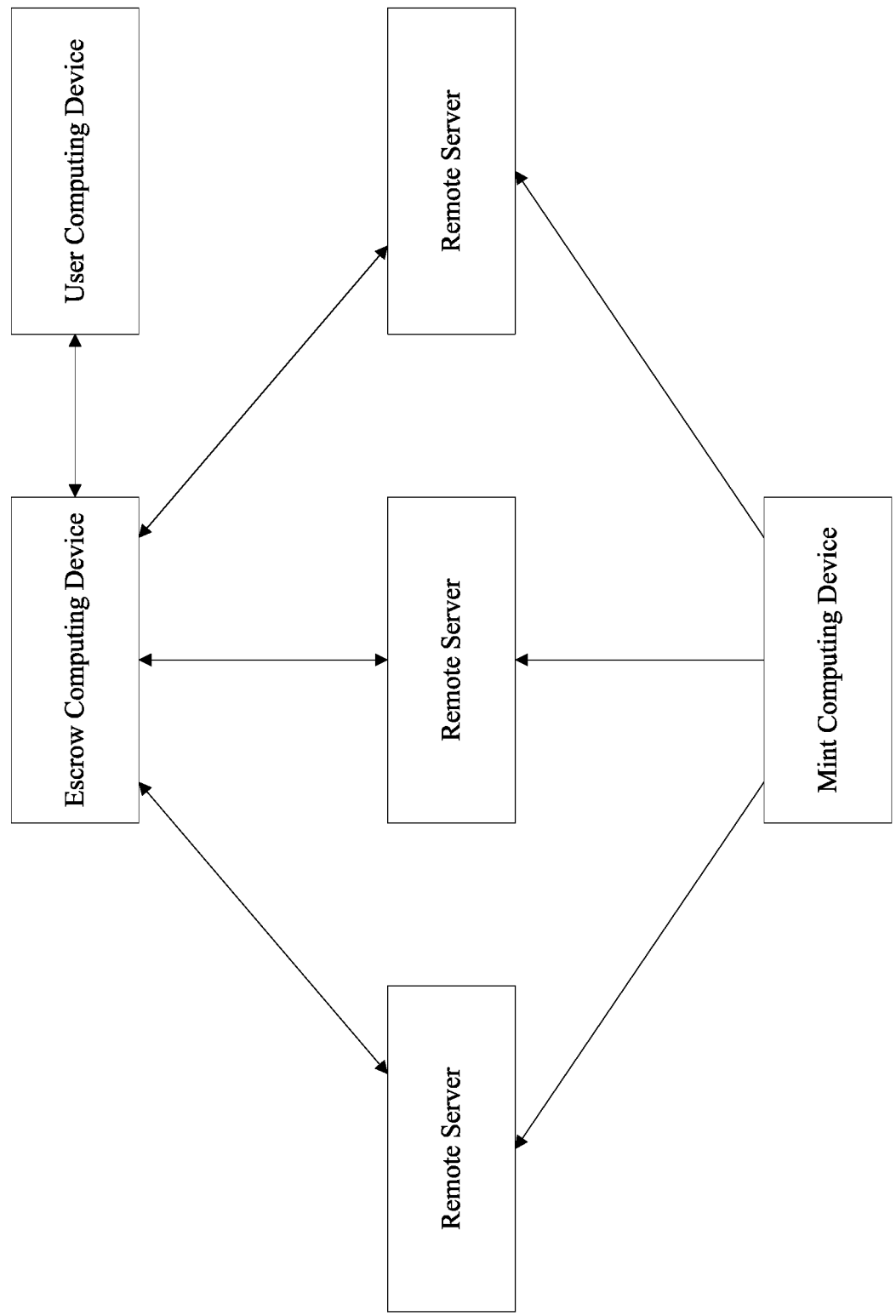
FIG. 3 is a schematic view of the system used by the present invention, showing how the escrow computing device and the mint computing device interact with the system.
Figure 4:
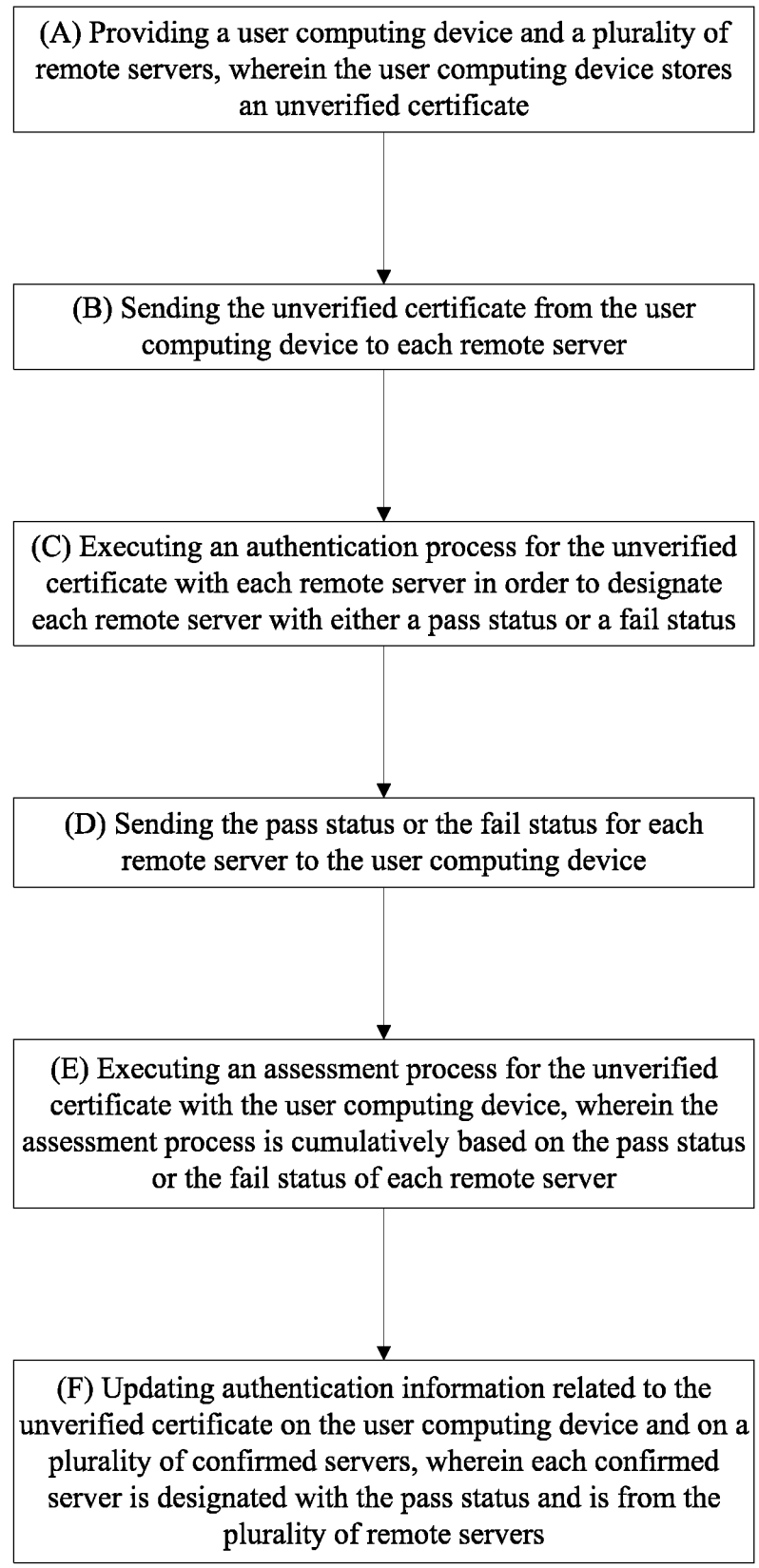
FIG. 4 is a flowchart for the overall process of the present invention.
Figure 19:
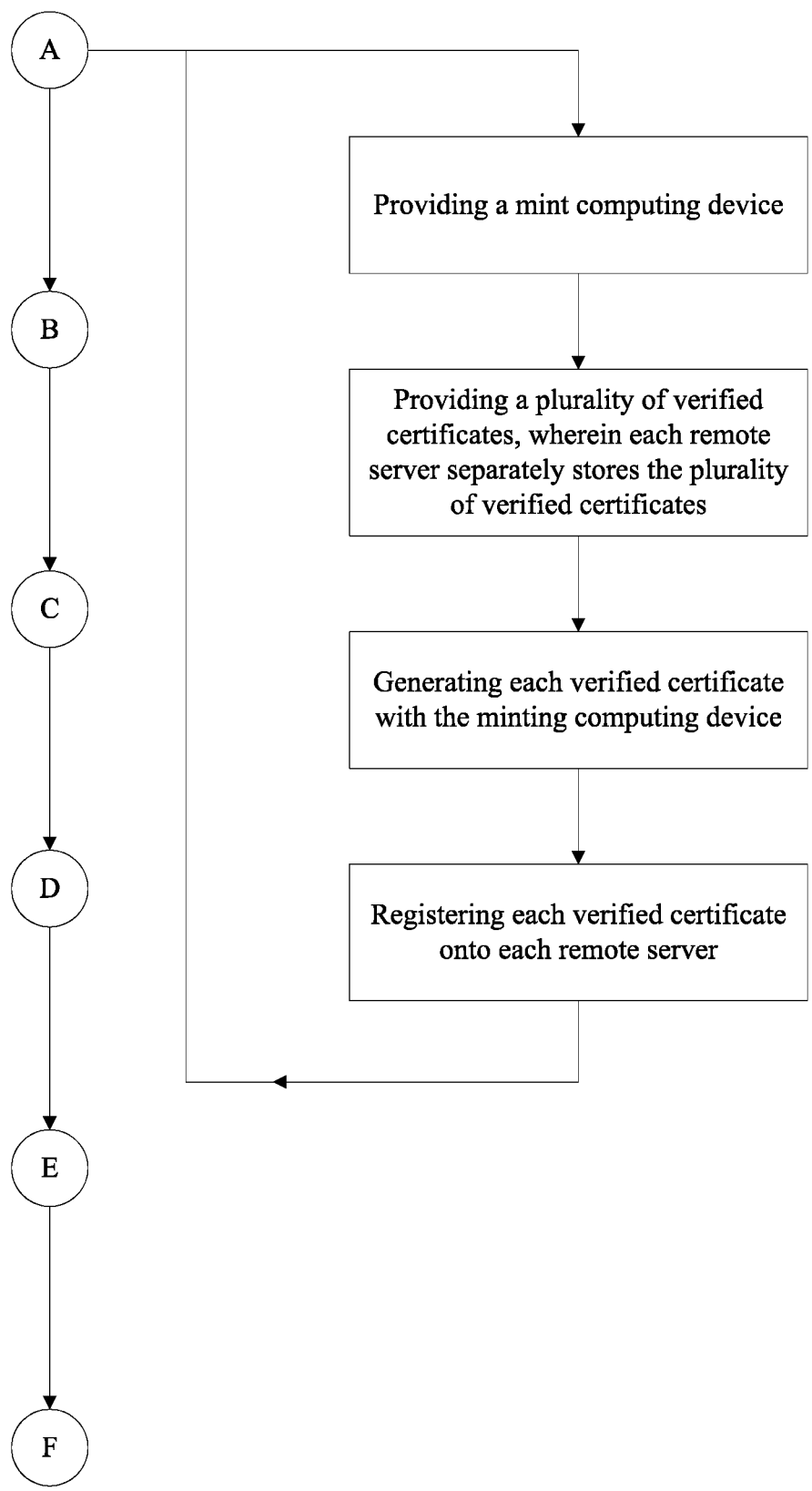
FIG. 19 is a flowchart describing the steps of generating the verified certificates with the mint computing device.

In reference to FIG. 3 and FIG. 19, the system comprises a mint computing device which is used to create each of the verified certificates. Each verified certificate is generated with the mint computing device and is registered onto each remote server. Once each of the verified certificates are created, additional verified certificates are prevented from being generated or registered. By limiting the number of verified certificates, the counterfeiting of virtual currency by creating new certificates may be prevented. During the process of generating each of the verified certificates, extraneous data may be processed. After all of the verified authentication certificates have been created, the extraneous data is deleted with the mint computing device. This is done to eliminate any information which may be used to counterfeit the verified certificates.

Figure 20:
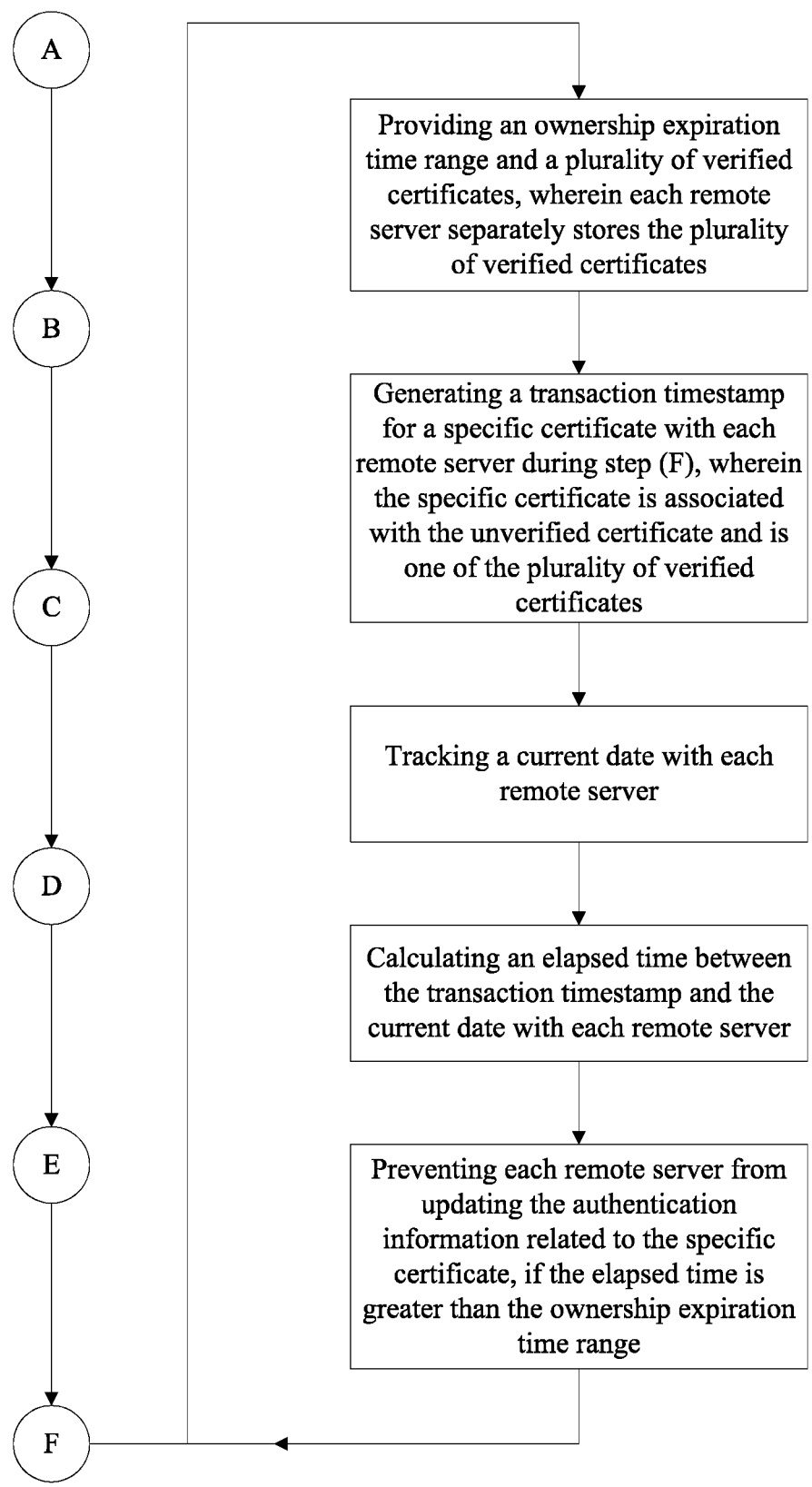
FIG. 20 is a flowchart describing the steps of preventing the remote servers from updating the authentication information of the specific certificate if the specific certificate expires.

In reference to FIG. 20, each of the remote servers stores an ownership expiration time range. The ownership expiration time range acts as an expiration date for the unverified certificate. During Step F, each remote server generates a transaction timestamp for a specific certificate. The specific certificate is one of the plurality of verified certificates and is associated with the unverified certificate. The transaction timestamp is used to track when the specific certificate was last updated, and therefore, when the unverified certificate was last exchanged. Each remote server tracks a current date and calculates an elapsed time between the transaction timestamp and the current date. If the elapsed time is greater than the ownership expiration time range, each remote server is prevented from updating the authentication information related to the specific certificate. This effectively locks the unverified certificate from being used.

Figure 21:
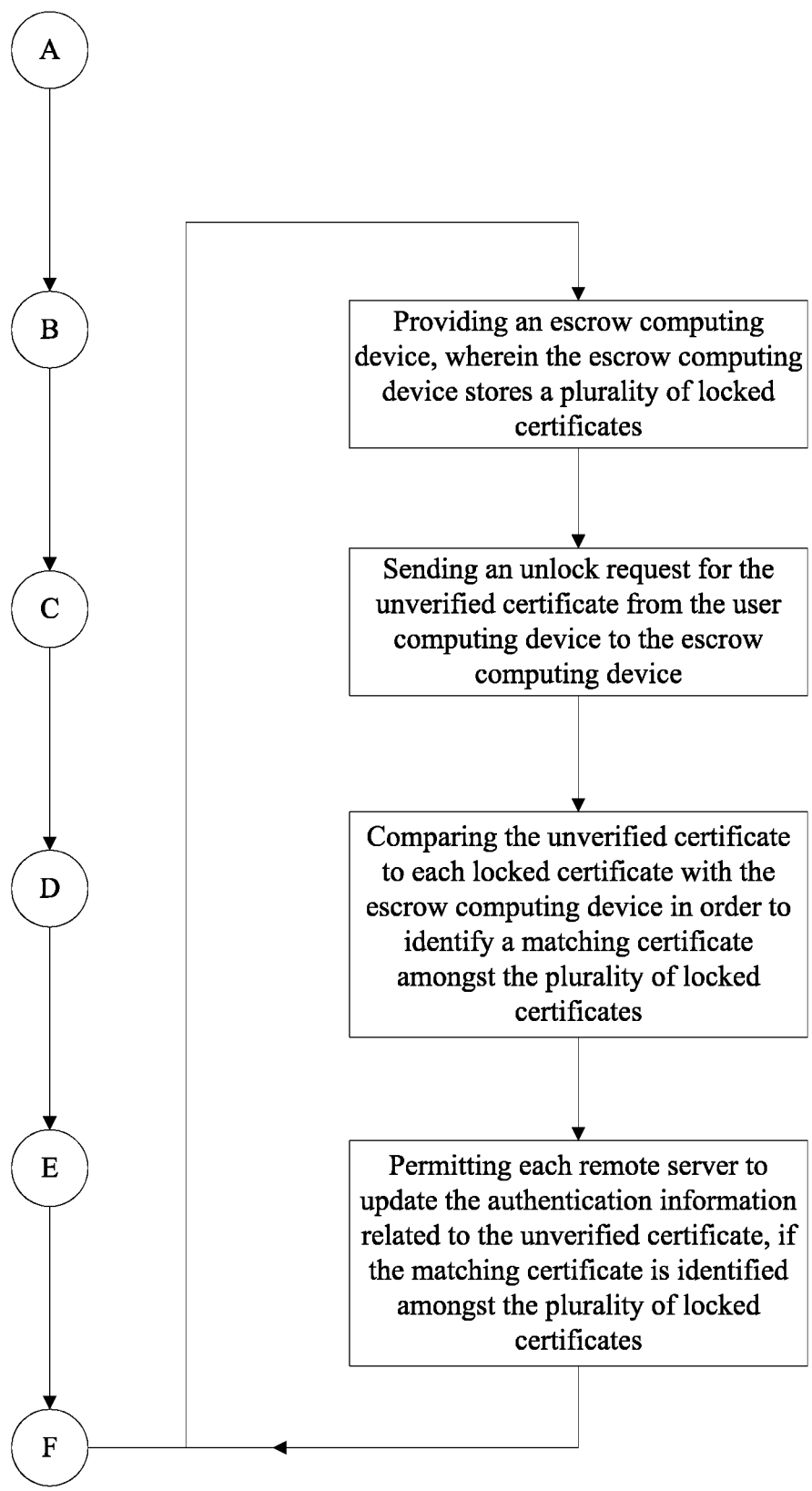
FIG. 21 is a flowchart describing the steps of unlocking the unverified certificate with the escrow computing device.

In reference to FIG. 3 and FIG. 21, the system comprises an escrow computing device which stores a plurality of locked certificates. The escrow computing device manages the locked certificates and is used to unlock the locked certificates if requested. To unlock the unverified certificate, the user computing device sends an unlock request for the unverified certificate to the escrow computing device. The escrow computing device then compares the unverified certificate to each locked certificate in order to identify a matching certificate amongst the plurality of locked certificates. If the matching certificate is identified amongst the plurality of locked certificates, each remote server is permitted to update the authentication information related to the unverified certificate. This allows the user computing device to regain control of the unverified certificate and exchange the unverified certificate as currency.

Although the invention has been explained in relation to its preferred embodiment, it is to be understood that many other possible modifications and variations can be made without departing from the spirit and scope of the invention as hereinafter claimed.

What is claimed is:

1. A method of authenticating and exchanging virtual currency, the method comprises the steps of:
   (A) providing a user computing device and a plurality of remote servers, wherein the user computing device stores an unverified certificate;
   (B) sending the unverified certificate from the user computing device to each remote server;
   (C) executing an authentication process for the unverified certificate with each remote server in order to designate each remote server with either a pass status or a fail status;
   (D) sending the pass status or the fail status for each remote server to the user computing device;
   (E) executing an assessment process for the unverified certificate with the user computing device, wherein the assessment process is cumulatively based on the pass status or the fail status of each remote server;
   (F) updating authentication information related to the unverified certificate on the user computing device and on a plurality of confirmed servers, wherein each confirmed server is designated with the pass status and is from the plurality of remote server;
   (G) providing a plurality of verified certificates, wherein each remote server separately stores the plurality of verified certificates;
   (H) comparing the unverified certificate to each verified certificate on an arbitrary server during step (C) in order to find a matching certificate amongst the plurality of verified certificates on the arbitrary server;
   (I) designating the pass status to the unverified certificate with the arbitrary server during step (C), if the matching certificate is identified amongst the plurality of verified certificates on the arbitrary server;
   (J) designating the fail status to the unverified certificate with the arbitrary server during step (C), if the matching certificate is not identified amongst the plurality of verified certificates on the arbitrary server; and
   (K) executing steps (H) through (J) with each remote server as the arbitrary server.

2. The method as claimed in claim 1 comprises:
   providing a virtual genuine article stored on an origin computing device, wherein the virtual genuine article corresponds to the unverified certificate;
   encoding the unverified certificate into the virtual genuine article with the origin computing device; and
   sending the virtual genuine article from the origin computing device to the user computing device before step (B).

3. The method as claimed in claim 1 comprises:
   providing a physical genuine article, wherein the physical genuine article corresponds to the unverified certificate, and wherein the unverified certificate is inscribed onto the physical genuine article; and
   receiving the unverified certificate from the physical genuine article with the user computing device before step (B).

4. The method as claimed in claim 1 comprises the steps of:
   providing the unverified certificate with a set of unverified authentication numbers, wherein each remote server is associated to a corresponding unverified authentication number from the set of unverified authentication numbers;
   providing each remote server with a verified authentication number for each verified certificate; and
   identifying the matching certificate amongst the plurality of verified certificates on the arbitrary server, if the corresponding unverified authentication number for the arbitrary server in the unverified certificate matches the verified authentication number for the arbitrary server in the matching certificate.

5. The method as claimed in claim 1 comprises the steps of:
   providing the unverified certificate with a set of proposed authentication numbers, wherein each remote server is associated to a corresponding proposed authentication number from the set of proposed authentication numbers;
   providing each remote server with a verified authentication number for each verified certificate; and
   updating the verified authentication number of the arbitrary server in the matching certificate to the corresponding proposed authentication number of the arbitrary server in the unverified certificate during step (F).

6. The method as claimed in claim 1 comprises the steps of:
   providing a required number of passing servers stored on the user computing device;
   compiling the pass status or the fail status for each remote server into a total number of passing servers and a total number of failing servers with the user computing device; and
   executing step (F), if the total number of passing servers is greater than or equal to the required number of passing servers.

7. The method as claimed in claim 1 comprises the steps of:
   providing at least one unconfirmed server from the plurality of remote servers, wherein the unconfirmed server is designated with the fail status;
   providing at least one trusted server associated to the unconfirmed server, wherein the trusted server is from the plurality of remote servers;
   sending the unverified certificate from the user computing device to the trusted server;
   comparing the unverified certificate to each verified certificate on the trusted server in order to find a matching certificate amongst the plurality of verified certificates on the trusted server; and
   routing a random repair code from the trusted server to the unconfirmed server through the user computing device, if the matching certificate is identified amongst the plurality of verified certificates on the trusted server.

8. The method as claimed in claim 7 comprises the steps of:
   providing the unverified certificate with a set of unverified authentication numbers, wherein each remote server is associated to a corresponding unverified authentication number from the set of unverified authentication numbers;
   providing each remote server with a verified authentication number for each verified certificate; and
   identifying the matching certificate amongst the plurality of verified certificates on the trusted server, if the corresponding unverified authentication number for the trusted server in the unverified certificate matches the verified authentication number for the trusted server in the matching certificate.

9. The method as claimed in claim 7 comprises the steps of:
providing a repair log managed by the trusted server; and
opening an entry associated to the unconfirmed server within the repair log with the trusted server, if the matching certificate is identified amongst the plurality of verified certificates on the trusted server.

10. The method as claimed in claim 1 comprises the steps of:
providing at least one unconfirmed server from the plurality of remote servers, wherein the unconfirmed server is designated with the fail status;
providing at least one trusted server associated to the unconfirmed server, wherein the trusted server is from the plurality of remote servers and stores a random repair code for the unconfirmed server;
providing a plurality of verified certificates, wherein each remote server separately stores the plurality of verified certificates;
receiving a verification repair code with the unconfirmed server, wherein the verification repair code is associated with the trusted server;
sending the verification repair code from the unconfirmed server to the trusted server;
comparing the unverified certificate to each verified certificate on the unconfirmed server in order to find a similar certificate amongst the plurality of verified certificates on the unconfirmed server, if the verification repair code matches the random repair code; and
updating the authentication information for the similar certificate on the unconfirmed server, if the similar certificate is identified amongst the plurality of verified certificates on the unconfirmed server.

11. The method as claimed in claim 10 comprises the steps of:
providing the unverified certificate with an unverified serial number;
providing each remote server with a verified serial number for each verified certificate; and
identifying the similar certificate amongst the plurality of verified certificates on the unconfirmed server, if the unverified serial number matches the verified serial number of the similar certificate.

12. The method as claimed in claim 10 comprises the steps of:
providing the unverified certificate with a set of proposed authentication numbers, wherein each remote server is associated to a corresponding proposed authentication number from the set of proposed authentication numbers;
providing each remote server with a verified authentication number for each verified certificate; and
updating the verified authentication number of the unconfirmed server in the similar certificate to the corresponding proposed authentication number of the unconfirmed server in the unverified certificate.

13. The method as claimed in claim 10 comprises the steps of:
providing a repair log managed by the trusted server;
searching through the repair log for an entry associated to the unconfirmed server with the trusted server, if the verification repair code matches the random repair code; and
deleting the entry from the repair log with the trusted server.

14. The method as claimed in claim 1 comprises the steps of:
providing a directory server, wherein a contact information for each of the plurality of remote servers is stored within the directory server;
prompting the directory server to send the contact information for at least one specific server to the user computing device, wherein the specific server is from the plurality of remote servers; and
sending the contact information for the specific server from the directory server to the user computing device.

15. The method as claimed in claim 1 comprises the steps of:
providing a mint computing device;
providing a plurality of verified certificates, wherein each remote server separately stores the plurality of verified certificates;
generating each verified certificate with the mint computing device; and
registering each verified certificate onto each remote server.

16. The method as claimed in claim 1 comprises the steps of:
providing an ownership expiration time range and a plurality of verified certificates, wherein each remote server separately stores the plurality of verified certificates;
generating a transaction timestamp for a specific certificate with each remote server during step (F), wherein the specific certificate is associated with the unverified certificate and is one of the plurality of verified certificates;
tracking a current date with each remote server;
calculating an elapsed time between the transaction timestamp and the current date with each remote server; and
preventing each remote server from updating the authentication information related to the specific certificate, if the elapsed time is greater than the ownership expiration time range.

17. The method as claimed in claim 1 comprises the steps of:
providing an escrow computing device, wherein the escrow computing device stores a plurality of locked certificates;
sending an unlock request for the unverified certificate from the user computing device to the escrow computing device;
comparing the unverified certificate to each locked certificate with the escrow computing device in order to identify a matching certificate amongst the plurality of locked certificates; and
permitting each remote server to update the authentication information related to the unverified certificate, if the matching certificate is identified amongst the plurality of locked certificates.

* * * * *